United States Patent
Colaw et al.

(10) Patent No.: US 11,754,507 B2
(45) Date of Patent: Sep. 12, 2023

(54) WORKFORCE AUGMENTING INSPECTION DEVICE

(71) Applicant: Lockheed Martin Corporation, Bethesda, MD (US)

(72) Inventors: Christopher Lee Colaw, Fort Worth, TX (US); Spencer Tull Meyer, Fort Worth, TX (US); Alexander McLean Tramm, Fort Worth, TX (US); Jean-Pierre Njock, II, Fort Worth, TX (US); Andrew Timothy Modjeski, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 289 days.

(21) Appl. No.: 17/222,445

(22) Filed: Apr. 5, 2021

(65) Prior Publication Data

US 2022/0317053 A1    Oct. 6, 2022

(51) Int. Cl.
| | | |
|---|---|---|
| *G01N 21/88* | (2006.01) | |
| *B64F 5/60* | (2017.01) | |
| *G06K 9/46* | (2006.01) | |
| *G06T 7/00* | (2017.01) | |

(Continued)

(52) U.S. Cl.
CPC ........... *G01N 21/8806* (2013.01); *B64F 5/60* (2017.01); *G06T 5/002* (2013.01); *G06T 7/0004* (2013.01); *G06V 10/44* (2022.01); *G01N 2021/8835* (2013.01); *G01N 2201/0221* (2013.01);
(Continued)

(58) Field of Classification Search
CPC ....... G01N 21/8806; G01N 2021/8835; G01N 2201/0221; B64F 5/60; G06V 10/44; G06T 5/002; G06T 7/0004; G06T 2207/10024; G06T 2207/30252; G06T 2210/12
See application file for complete search history.

(56) References Cited

U.S. PATENT DOCUMENTS

| | | |
|---|---|---|
| 5,954,296 A | 9/1999 | Jahsman et al. |
| 7,743,660 B2 | 6/2010 | Marsh et al. |
| 8,368,749 B2 | 2/2013 | Lambdin et al. |

(Continued)

FOREIGN PATENT DOCUMENTS

| | | |
|---|---|---|
| CA | 2362712 | 8/2000 |
| CN | 112212923 | 1/2021 |

(Continued)

*Primary Examiner* — Jamil Ahmed
(74) *Attorney, Agent, or Firm* — Baker Botts L.L.P.

(57) ABSTRACT

In one embodiment, systems and methods include using a workforce augmenting inspection device ("WAND") to measure a parameter of an aircraft. The WAND comprises a body, wherein the body comprises one or more buttons configured to actuate the WAND to perform one or more functions. The WAND further comprises a head comprising a camera and a light source, wherein the light source is disposed around the camera operable to produce light in conjunction with operation of the camera, wherein the camera is operable to capture an image within a scope of view of the camera. The WAND further comprises a standoff wheel, wherein the standoff wheel is operable to rotate independently of the head. The WAND further comprises a power source operable to provide power to the WAND, wherein the power source comprises a controller configured to actuate the head, camera, and light source.

12 Claims, 4 Drawing Sheets

(51) Int. Cl.
*G06T 5/00* (2006.01)
*G06V 10/44* (2022.01)
(52) U.S. Cl.
CPC ............... *G06T 2207/10024* (2013.01); *G06T 2207/30252* (2013.01); *G06T 2210/12* (2013.01)

(56) References Cited

U.S. PATENT DOCUMENTS

| | | |
|---|---|---|
| 9,638,553 B2 | 5/2017 | Coombs et al. |
| 10,081,443 B2 | 9/2018 | Engel et al. |
| 10,670,531 B2 | 6/2020 | Gupta et al. |
| 10,866,927 B2 | 12/2020 | Gupta et al. |
| 2009/0016650 A1 | 1/2009 | Bell et al. |
| 2015/0054942 A1 | 2/2015 | Coombs et al. |
| 2015/0253766 A1 | 9/2015 | Pettersson et al. |
| 2019/0311555 A1 | 10/2019 | Troy et al. |
| 2020/0401019 A1* | 12/2020 | Hewitt .................. F16M 11/10 |

FOREIGN PATENT DOCUMENTS

| | | |
|---|---|---|
| FR | 3071080 | 9/2019 |
| JP | 5177595 | 4/2013 |
| WO | WO 2020/080480 | 4/2020 |
| WO | WO 2021/014514 | 1/2021 |

\* cited by examiner

WORKFORCE AUGMENTING INSPECTION DEVICE

TECHNICAL FIELD

This disclosure generally relates to inspection devices for aircraft, and more specifically to a handheld inspection device with a constant standoff.

BACKGROUND

Drones have been used to acquire measurements of aircraft for higher, difficult to reach areas. For areas closer to the ground, measurements have been acquired through visual inspection and are often prone to be subjective with variance.

SUMMARY

According to an embodiment, a workforce augmenting inspection device ("WAND") comprises a body, wherein the body comprises one or more buttons configured to actuate the WAND to perform one or more functions. The WAND further comprises a head disposed at a first end of the body, wherein the head comprises a camera and a light source, wherein the light source is disposed around the camera operable to produce light in conjunction with operation of the camera, wherein the camera is operable to capture an image within a scope of view of the camera. The WAND further comprises a standoff wheel coupled to the head, wherein the standoff wheel is operable to rotate independently of the head, wherein the diameter of the standoff wheel is greater than the dimensions of the head. The WAND further comprises a power source disposed at a second end of the body operable to provide power to the WAND, wherein the power source comprises a controller, wherein the controller is communicatively coupled to and configured to actuate the head, camera, and light source.

According to another embodiment, a non-transitory computer-readable medium comprises instructions that are configured, when executed by a processor, to receive an image captured by a camera of a workforce augmenting inspection device. The instructions are further configured to cause the processor to remove background noise from the image to produce an image by thresholding the received image. The instructions are further configured to cause the processor to determine the shape of the tracks of a charge holder depicted within the produced image. The instructions are further configured to cause the processor to remove excess noise from the produced image and to determine a measurement of the distance of the width of the tracks of the charge holder with a selected algorithm.

According to a further embodiment, a workforce augmenting inspection device ("WAND") comprises a body, wherein the body comprises one or more buttons configured to actuate the WAND to perform one or more functions. The WAND further comprises a head disposed at a first end of the body, wherein the head comprises a camera and a light source, wherein the light source is disposed around the camera operable to produce light in conjunction with operation of the camera, wherein the camera is operable to capture an image within a scope of view of the camera. The WAND further comprises a plurality of standoff legs disposed at the first end of the body, wherein each of the plurality of standoff legs extends past the head from the body. The WAND further comprises a power source disposed at a second end of the body operable to provide power to the WAND, wherein the power source comprises a controller, wherein the controller is communicatively coupled to and configured to actuate the head, camera, and light source.

Certain embodiments may include none, some, or all of the technical advantages discussed above. One or more other technical advantages may be readily apparent to one skilled in the art from the figures, descriptions, and claims included herein.

BRIEF DESCRIPTION OF THE DRAWINGS

To assist in understanding the present disclosure, reference is now made to the following description taken in conjunction with the accompanying drawings, in which.

DETAILED DESCRIPTION

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 4B, where like numbers are used to indicate like and corresponding parts.

Figure 1:
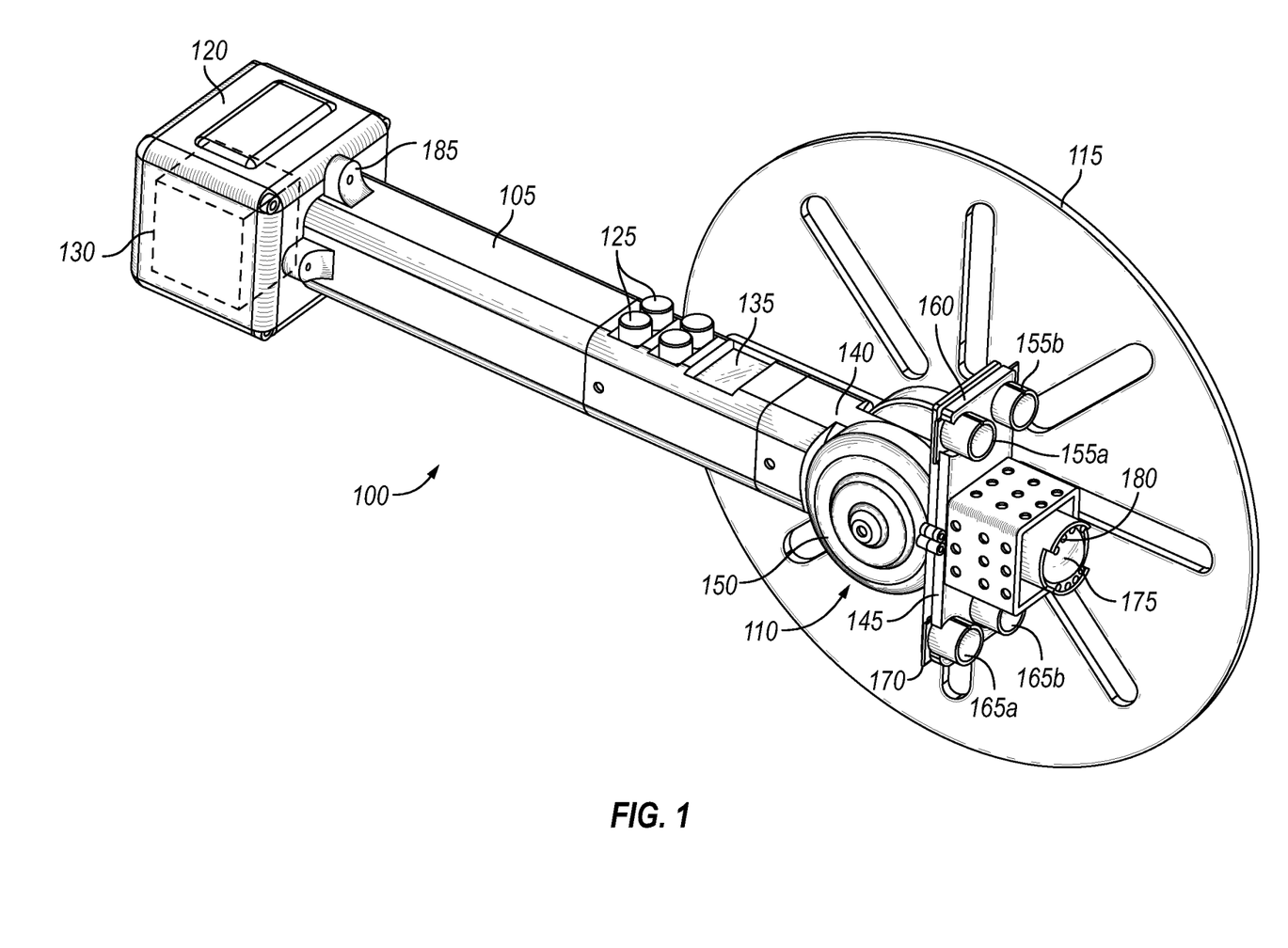
FIG. 1 illustrates an example workforce augmenting inspection device ("WAND"), according to certain embodiments.

FIG. 1 illustrates an example workforce augmenting inspection device ("WAND") 100. The WAND 100 may be configured to measure a parameter of an aircraft (not shown). For example, the WAND 100 may be operable to measure the width of a charge holder (for example, charge holder 400 in FIG. 4B) incorporated into a canopy of an aircraft (for example, canopy 405 in FIG. 4A). In one or more embodiments, the WAND 100 may be configured to be hand-held by an operator to inspect aircraft, wherein the WAND 100 is not limited to measuring the canopy of an aircraft. Without limitations, the WAND 100 may be operable to measure any suitable number of holes, fasteners, junctions, structures, distances, angles, and any combinations thereof. The WAND 100 may be configured to transmit measurements to an information handling system (for example, information handling system 300 in FIG. 3) for further processing.

Figure 3:
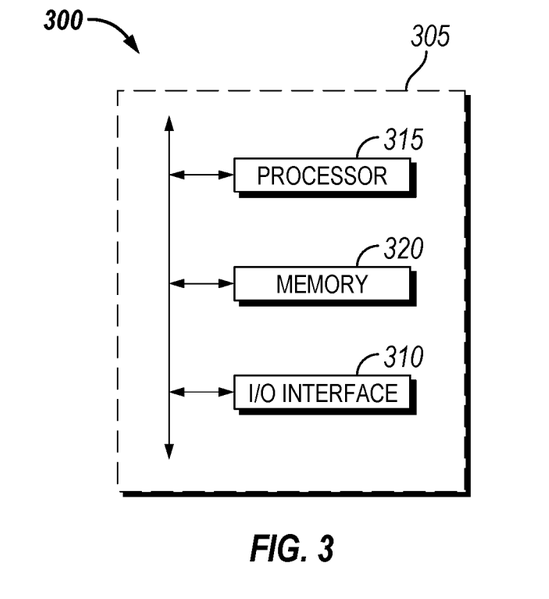
FIG. 3 illustrates an example information handling system to process the measurements obtained by the WAND in FIGS. 1-2, according to certain embodiments.

The WAND 100 may comprise a body 105, a head 110, a standoff wheel 115, and a power source module 120. The body 105 may be comprised of any suitable materials, including, but not limited to, metals, nonmetals, ceramics, composites, polymers, and any combinations thereof. The body 105 may be any suitable size, height, shape, or any combinations thereof. As illustrated, the body 105 may comprise a square or rectangular cross-section and be in the shape of an elongated rod. The body 105 may comprise a length greater than the width and depth of the body 105. The body 105 may be operable to be maneuverable by an operator (i.e., handheld). The body 105 may be partially hollow and may comprise an internal cavity (not shown), wherein any suitable electrical equipment and/or electronics may be housed. In one or more embodiments, there may be one or more buttons 125 disposed along the body 105. The one or more buttons 125 may be communicatively coupled to a controller 130 incorporated into the WAND 100. As illustrated, the controller 130 may be disposed within the power source module 120. In other embodiments, the controller 130 may be disposed about any suitable location within the WAND 100, for example, within the body 105. The one or more buttons 125 may be configured to actuate the WAND 100 to perform certain functions. Without limitations, these functions may include switching between a first mode of operation and a second mode of operation, actuating the head 110 to rotate in a first direction, actuating the head to rotate in a second direction, and any combinations. In embodiments, the first mode of operation of the WAND 100 may be automated, and the second mode of operation of the WAND 100 may be manual. The body 105 may further comprise a display 135 disposed along a surface of the body 105. The display 135 may be operable to display data to an operator of the WAND 100. The display 135 may be disposed adjacent to the one or more buttons 125 and may be communicatively coupled to the controller 130. Without limitations, the display 135 may display the standoff distance from the head 110 to an external structure (for example, the canopy 405 in FIG. 4A), a parameter being measured by the WAND 100, the mode of operation of the WAND 100, the angle at which the head 110 is rotated relative to the body 105, and any combinations thereof. As illustrated, the head 110 may be disposed at a first end 140 of the body 105.

The head 110 may be secured to the body 105 by any suitable means. Without limitations, such means may include, adhesives, brazing, welding, suitable fasteners, threading, or any combinations thereof. The head 110 may be comprised of any suitable materials, including, but not limited to, metals, nonmetals, ceramics, composites, polymers, and any combinations thereof. The head 110 may be any suitable size, height, shape, or any combinations thereof. As illustrated, the head 110 may be a circular structure with a bracket 145 disposed thereon. There may be a servomotor 150 disposed within the circular structure of the head 110. Without limitations, any suitable type of actuator capable of providing rotation may be used as the servomotor 150. The servomotor 150 may be operable to provide rotation of up to about 90° with reference to a central axis of the body 105, wherein the servomotor 150 may rotate about 90° in either direction from the central axis. The servomotor 150 may be configured to provide rotation to the head 110 by rotating the bracket 145 when actuated. The bracket 145 may be coupled to the servomotor 150 through any suitable means. The bracket 145 may be any suitable size, height, shape, or any combinations thereof. In embodiments, there may be a first set of distance sensors 155a,155b disposed at a top end 160 of the bracket 145 and a second set of distance sensors 165a,165b disposed at a bottom end 170 of the bracket 145. The distance sensor 155a may operate concurrently, or in conjunction with, distance sensor 155b, and the distance sensor 165a may operate concurrently, or in conjunction with, distance sensor 165b. Any suitable sensor configured to measure a distance may be used as the first set of distance sensors 155a,155b and the second set of distance sensors 165a,165b. In one or more embodiments, one of the first set of distance sensors 155a,155b may output a signal, and the other one of the first set of distance sensors 155a,155b may receive a reflection of the output signal after a period of time. The controller 130 may process the reflected output signal and the period of time to determine a distance from first set of distance sensors 155a,155b to an external structure. In embodiments, the second set of distance sensors 165a,165b may operate in a similar manner as the first set of distance sensors 155a,155b.

In one or more embodiments, there may be a camera 175 disposed on the bracket 145 between the first set of distance sensors 155a,155b and the second set of distance sensors 165a,165b. The camera 175 may be disposed about a center of the bracket 145. Without limitations, any suitable camera may be used as the camera 175. There may further be a light source 180 disposed around the camera 175 configured to provide light for operation of the camera 175. The light source 180 may be disposed concentric to the camera 175 or at least partially around the camera 175. In embodiments, the camera 175 may be configured to capture or record a picture, a plurality of pictures, a video, and any combinations thereof of any suitable structure within the scope of view of the camera 175. In one or more embodiments, both the camera 175 and the light source 180 may be communicatively coupled to the controller 130, wherein the controller 130 may provide instructions to actuate the camera 175 and/or the light source 180. The controller 130 may further be configured to receive and process any suitable signals and/or data from the camera 175.

As illustrated, the standoff wheel 115 may be coupled to the head 110. The standoff wheel 115 may be secured to the head 110 by any suitable means. Without limitations, such means may include, adhesives, brazing, welding, suitable fasteners, threading, or any combinations thereof. In embodiments, the standoff wheel 115 may be configured to rotate independently of the head 110 and to provide for a constant standoff distance between the WAND 100 and an external structure. For example, if the head 110 rotates clockwise by 20°, the standoff wheel 115 may not rotate in conjunction with the head 110. The standoff wheel 115 may be comprised of any suitable materials, including, but not limited to, metals, nonmetals, ceramics, composites, polymers, and any combinations thereof. The standoff wheel 115 may be any suitable size, height, shape, or any combinations thereof As illustrated, the standoff wheel 115 may be in the shape of a circle and comprises a diameter greater than the dimensions of the head 110. The standoff wheel 115 may be configured to be pressed against the external structure in order for the WAND 100 to measure a parameter of the external structure. The WAND 100 may translate in relation to the external structure while maintaining physical contact between the standoff wheel 115 and the external structure. As the WAND 100 translates in relation to the external structure, the standoff wheel 115 may freely rotate.

In one or more embodiments, the power source module 120 may be disposed at a second end 185 of the body 105, wherein the second end 185 is opposite of the first end 140. The power source module 120 may be operable to provide power to each of the components of the WAND 100. In one or more embodiments, the power source module 120 may comprise one or more batteries, an interchangeable battery unit, a rechargeable battery, and any combinations thereof. The power source module 120 may further comprise a port (not shown) configured to transmit data to an information handling system (for example, information handling system 300 in FIG. 3) for further processing.

Figure 2:
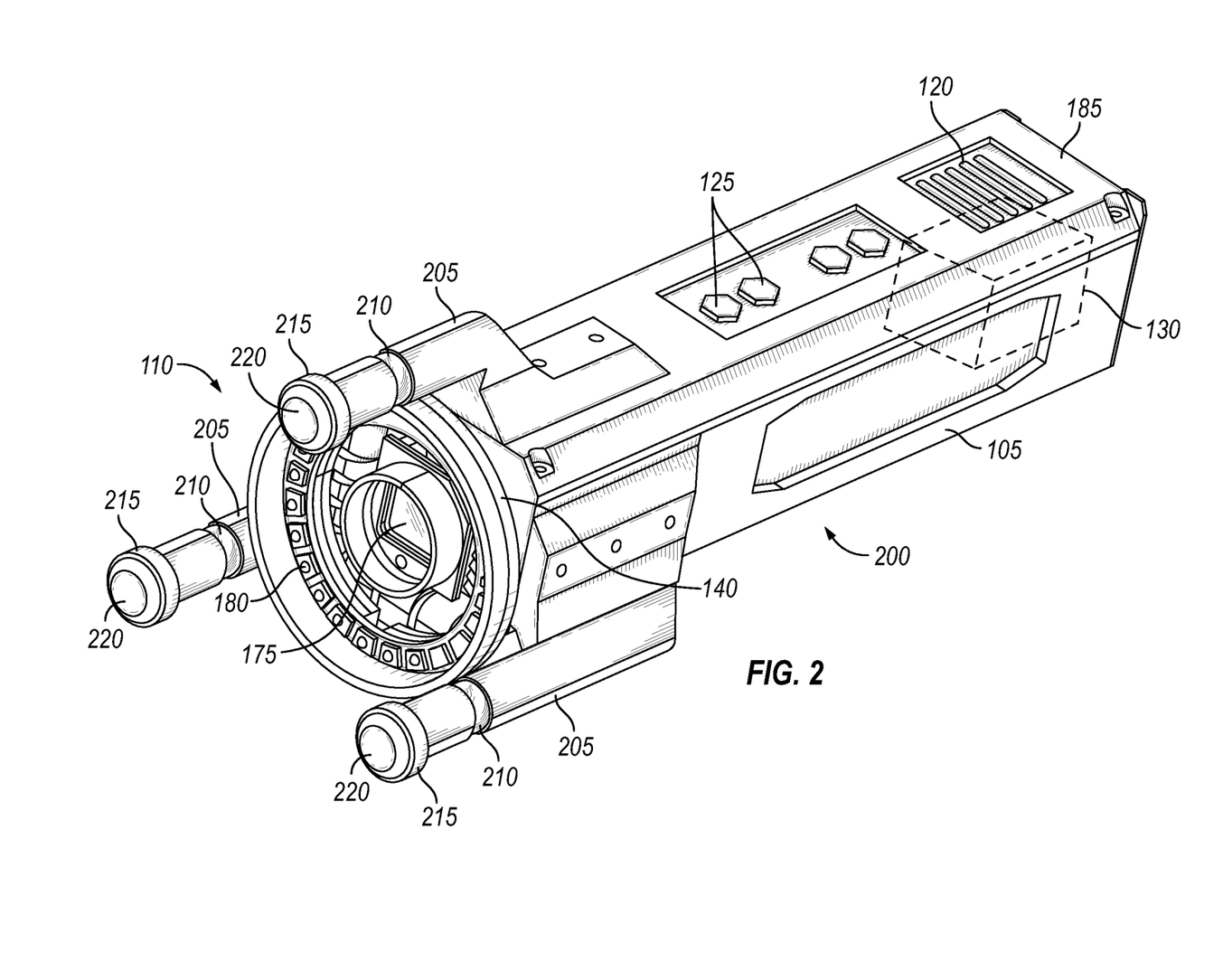
FIG. 2 illustrates an example WAND, according to certain embodiments.

FIG. 2 illustrates an example WAND 200. As shown in FIG. 2, WAND 200 includes a body 105, a head 110, a plurality of standoff legs 205, and a power source module 120. Generally, WAND 200 may operate similarly to WAND 100 (referring to FIG. 1). The WAND 200 may be configured to measure a parameter of an aircraft (not shown). In one or more embodiments, the WAND 200 may be configured to be hand-held by an operator to inspect aircraft. Without limitations, the WAND 200 may be operable to measure any suitable number of holes, fasteners, junctions, structures, distances, angles, and any combinations thereof. The WAND 200 may be configured to transmit measurements to an information handling system (for example, information handling system 300 in FIG. 3) for further processing.

Generally, body 105, head 110, and power source 120 may operate similarly as they did in WAND 100. For example, body 105 may be operable to be maneuverable by an operator (i.e., handheld). The body 105 may be partially hollow and may comprise an internal cavity (not shown), wherein any suitable electrical equipment and/or electronics may be housed. In one or more embodiments, there may be one or more buttons 125 disposed along the body 105. The one or more buttons 125 may be communicatively coupled to a controller 130 incorporated into the WAND 200. The controller 130 may be disposed about any suitable location within and/or external to the WAND 200. The one or more buttons 125 may be configured to actuate the WAND 100 to perform certain functions. Without limitations, these functions may include switching between different colors produced by a light source 180 disposed around a camera 175, adjusting a brightness of the light produced by the light source 180, and any combinations. In certain embodiments, the body 105 may further comprise a display (not shown) disposed along a surface of the body 105. The display may be operable to display data to an operator of the WAND 200.

The head 110 may be disposed at a first end 140 of the body 105, and the power source 120 may be disposed at a second end 185 of the body 105, wherein the second end 185 is opposite of the first end 140. The power source module 120 may be operable to provide power to each of the components of the WAND 200. The head 110 may comprise the camera 175 and the light source 180. The camera 175 may be configured to capture or record a picture, a plurality of pictures, a video, and any combinations thereof of any suitable structure within the scope of view of the camera 175. In one or more embodiments, both the camera 175 and the light source 180 may be communicatively coupled to the controller 130, wherein the controller 130 may provide instructions to actuate the camera 175 and/or the light source 180. The controller 130 may further be configured to receive and process any suitable signals and/or data from the camera 175.

One significant difference between WAND 200 and WAND 100 is that WAND 200 includes a plurality of standoff legs 205 instead of the standoff wheel 115 illustrated with WAND 100 in FIG. 1. As seen in the example of FIG. 2, there may be three standoff legs 205 disposed at the first end 140 of the body 105 that extend past the head 110. While the present disclosure illustrates three standoff legs 205, the disclosure is not limited to three standoff legs 205. The present embodiment may provide for each standoff leg 205 to be disposed 120° away from each other along the body 105. A tripod leg formation of the plurality of standoff legs 205 may allow for the WAND 200 to be at a consistent offset distance when inspecting a curved surface (for example, canopy 405 in FIG. 4A). Any other leg formation may cause WAND 200 to wobble when placed on an aircraft, thereby providing for inaccurate measurements. The plurality of standoff legs 205 may be interchangeable to allow for adjustment of fixed standoff distance based on the requirements of the inspection. The plurality of standoff legs 205 may be coupled to the body 105, at the first end 140, by any suitable means. Without limitations, such means may include, adhesives, brazing, welding, suitable fasteners, threading, or any combinations thereof. The plurality of standoff legs 205 may be comprised of any suitable materials, including, but not limited to, metals, nonmetals, ceramics, composites, polymers, and any combinations thereof. The head 110 may be any suitable size, height, shape, or any combinations thereof.

In one or more embodiments, each of the plurality of standoff legs 205 may comprise a ball joint 210. The ball joint 210 may be disposed about any suitable location along a respective standoff leg 205. The ball joint 210 may be configured to allow the plurality of standoff legs 205 to swivel or rotate with respect to a distal end 215 of the plurality of standoff legs 205. There may be contact pads 220 disposed at each distal end 215. In embodiments, the contact pads 220 may be configured to be pressed against an external surface. The contact pads 220 may comprise of any suitable materials, such as felt, that do not damage an external surface when applying pressure against such a surface.

As illustrated, the scope of view of the camera 175 may be in the same direction as the direction wherein the plurality of standoff legs 205 are extending from the body 105. As a result, during operations, the camera 175 may be actuated to record and/or capture an image, images, video, or any combinations thereof of an external surface within that scope of view. During operations, the distal ends 215 of each of the plurality of standoff legs 205 may maintain physical contact with the external surface when the WAND 200 is disposed against such a surface for obtaining measurements. The operator may adjust the angle of the WAND 200 in relation to the external surface, while maintaining contact with the external surface at the distal ends 215, by rotating or swiveling the plurality of standoff legs 205 at the ball joints 210. In these operations, the scope of view of the camera 175 may change, and the WAND 200 may be configured to determine the angle of the camera 175, and/or the WAND 200, with respect to the external surface and to obtain measurements at this adjusted scope of view.

As previously disclosed, the WAND 200 may be configured to transmit measurements to an information handling system (for example, information handling system 300 in FIG. 3) for further processing. The information handling system may be any processing device operable to process measurements from and/or transmit instructions to WAND 100 and/or WAND 200. The information handling system may be hard-wired and/or wirelessly connected to the WAND 100 and/or WAND 200. The information handling system may use one or more elements illustrated in FIG. 3.

FIG. 3 illustrates an example of elements 305 that may be included in an information handling system 300, according to embodiments. For example, information handling system 300 may include one or more input/output (I/O) interface(s) 310, processing circuitry such as a processor 315, memory(ies) 320, and/or other suitable element(s). Interface 310 receives input, sends output, processes the input and/or output, and/or performs other suitable operation. Interface 310 may comprise hardware and/or software.

Processing circuitry performs or manages the operations of the component. Processing circuitry may include hardware and/or software. Examples of a processing circuitry include one or more computers, one or more microprocessors, one or more applications, etc. In certain embodiments, processing circuitry executes logic (e.g., instructions) to perform actions (e.g., operations), such as generating output from input. The logic executed by processing circuitry may be encoded in one or more tangible, non-transitory computer readable media (such as memory 320). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 320 (or memory unit) stores information. Memory 320 may comprise one or more non-transitory, tangible, computer-readable, and/or computer-executable storage media. Examples of memory 320 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 4A:
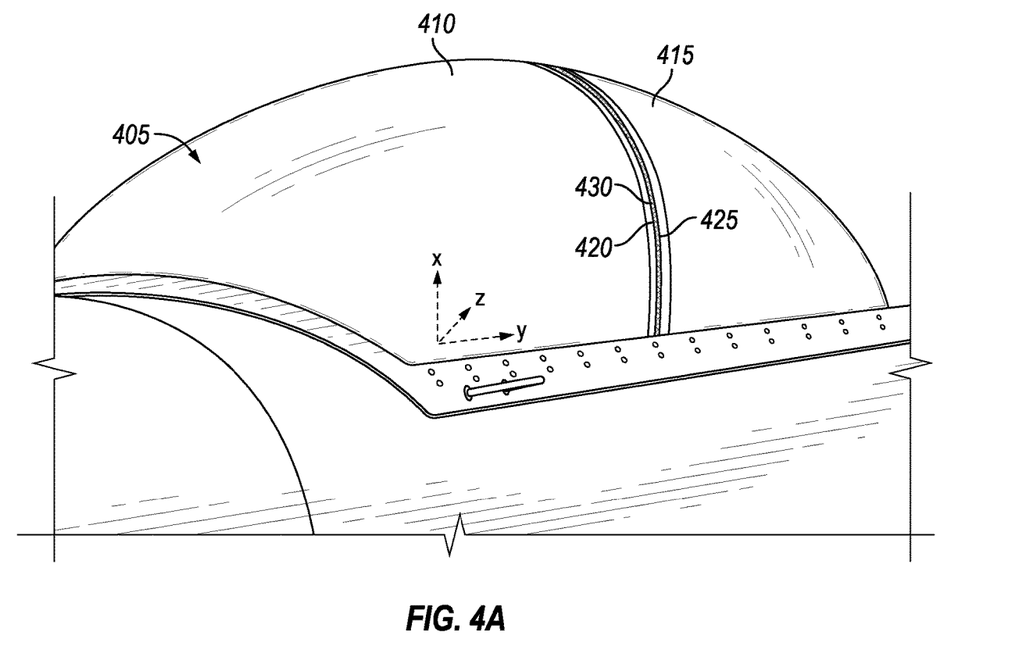
FIG. 4A illustrates an example canopy, according to certain embodiments.
Figure 4B:
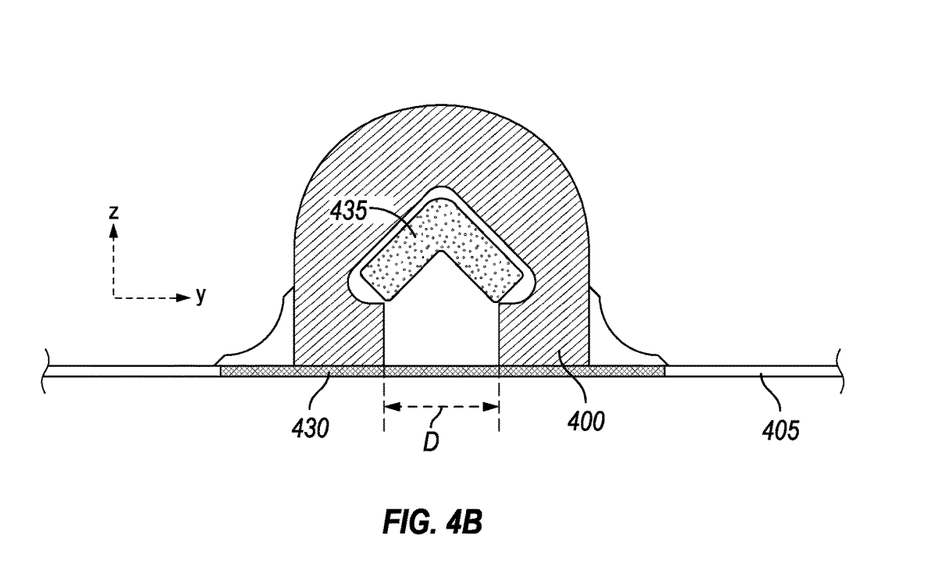
FIG. 4B illustrates a cross-section of an example charge holder within the canopy in FIG. 4A, according to certain embodiments.

FIGS. 4A-4B illustrate an example charge holder 400 and an example canopy 405, wherein FIG. 4A illustrates the canopy 405, and FIG. 4B illustrates a cross-section of the canopy 405 with the charge holder 400. The canopy 405 may comprise of a first portion 410 and a second portion 415, wherein the first portion 410 and the second portion 415 are separable components. The first portion 410 and the second portion 415 may be coupled together where an end 420 of the first portion 410 abuts an end 425 of the second portion 415. As illustrated, an adhesive 430 may be applied to join the first portion 410 to the second portion 415. In embodiments, any suitable adhesive, such as RTV silicone, may be used as the adhesive 430. During assembly of the canopy 405, the charge holder 400 may be disposed at an interior of the canopy 405 where the first portion 410 couples to the second portion 415.

With reference to FIG. 4B, the charge holder 400 may be disposed along the interior of the canopy 405 where the adhesive 430 has been applied to secure the first portion 410 (referring to FIG. 4A) to the second portion 415 (referring to FIG. 4A). A charge 435 may be disposed within charge holder 400 offset from the canopy 405 by a certain distance. The charge 435 may comprise any suitable material capable of providing an explosive force, such as flexible linear shape charges (FLSC) and/or mild detonating cord (MDC). In embodiments, the charge 435 may provide force to fracture the canopy 405 and free the first portion 410 from the second portion 415 while also imparting a forceful aftward propulsion.

With reference to FIGS. 1-4B, a method as presented in the present disclosure may be described. An operator may utilize the WAND 100 and/or the WAND 200 to measure a parameter of the canopy 405. For example, the WAND 100 and/or the WAND 200 may measure a distance D of the width within the charge holder 400. The WAND 100 and/or the WAND 200 may be able to determine whether the charge 435 is or is not properly placed within charge holder 400 by analyzing the distance D throughout the canopy 405. An operator may dispose the WAND 100 against the canopy 405 in order to obtain measurements through the camera 175. Similarly, the WAND 200 may be disposed against the canopy 405. The operator may either translate the WAND 100 along the canopy 405 at a fixed offset provided by the standoff wheel 115 and/or adjust the WAND 200 by rotating or swiveling the plurality of standoff legs 205 to a different angle to change the scope of view of the camera 175 at multiple points along the canopy 175.

The information handling system 300 may receive data captured by the camera 175 via the controller 130. The information handling system 300 may be operable to process and determine any structural defects based, at least in part, on the received data. The information handling system 300 may further be operable to remove noise from an image.

In one or more embodiments, the information handling system 300 may use Otsu's method to split features of an image into two classes: background and foreground. The WAND 100 and/or WAND 200 may utilize purple light to minimize variable light, glare, and any other outside noise. The WAND 100 and/or WAND 200 may further color the areas of interest within an image in purple. The present disclosure is not limited to using the color purple and can utilize any other suitable colors. The gamma setting of the camera 175 may be set to 2.5 which may darken outside noise while focusing on the colored (for example, purple) tracks of the canopy 405, wherein the distance D is measured between the tracks of the charge holder 400. This may produce an image having been processed to remove nose, making any other suitable computer vision algorithms for measurement more efficient. For example, any suitable artificial intelligence software may be utilized for autonomous defect detection. In alternate embodiments, the thresholding function to remove noise may include MATLAB's color thresholder application.

After thresholding the image to remove noise, the information handling system 300 may be configured to operate computer vision algorithms for tracks of the charge holder 405 in the shape of T-junctions, J-curves, and curves and straight lines. For curves and straights, after thresholding the image, the produced image may be input into a straight and curve measurement algorithm. The straight and curve algorithm may first remove excess noise in the produced image that was not removed during thresholding. After removing excess noise, holes in the produced image may be populated. Holes may occur after thresholding images. A blob search algorithm may be implemented to locate the tracks within the produced image, which provides us a bounding box of where each track is located. A bounding box may be an array of values which specify the width and height of a box that surrounds the object of interest (for example, the tracks). If two tracks are not found using the blob search algorithm (e.g. #tracks>2 or #tracks<2) then the algorithm may end. Then, the position and orientation of the tracks may be determined, wherein vertically stacked tracks are tracks on top of each other (i.e., top and bottom) and are pointing in a horizontal orientation, and wherein horizontally stacked tracks are tracks are next to each other (i.e., left and right) and are pointed in a vertical orientation. The pixel coordinates for the interior edge of each track may then be determined. For the vertically stacked tracks, the interior edges may be the bottom edge of the top track and the top edge of the bottom track. For horizontally stacked tracks, the interior edges would be the right edge of the left track and the left edge of the right track. The pixel coordinate data may be used to create a best-fit-line that shapes the interior edge(s) of each track. In embodiments, first and second order polynomial functions may be used when representing the shape of the interior edges of each track. Once the best-fit-line is determined, the information handling system 300 may begin measure between each track.

An arbitrary point (x,y) on one track may be selected. The tangent line at that specified point may be determined. The perpendicular line to the tangent line at the specified point may be determined. The information handling system 300 may determine the intersection between the perpendicular line and the best-fit-line of the opposing track, where the measurement between the two tracks may be the distance between the selected arbitrary point and the intersection. This process may be repeated for each point on the track.

For T-junctions, after thresholding the image, the produced image may be input into a separate algorithm for t-gaps. The separate algorithm may first remove excess noise in the produced image that was not removed during thresholding. After removing excess noise, holes in the produced image may be populated. Holes may occur after thresholding images. A blob search algorithm may be implemented to locate the tracks within the produced image, which provides us a bounding box of where each track is located. Then, the position and orientation of the tracks may be determined. If there is not a track within a top portion of the produced image, the algorithm may end. Otherwise, the algorithm may then determine the location of a bottom track. The pixel coordinates for the interior edge of each track may then be determined. For the top track, the interior edge on the lower edge of the track may be determined. For the bottom track, the interior edge on the upper edge of the track may be determined. The pixel coordinate data may be used to determine measurements from the produced image.

The first pixel point (x,y) may be selected. The algorithm may traverse in one direction until intersecting the opposing track. If the opposing track is not intersected, that measurement may be discarded. Valid measurements may be recorded for the distance D where there is an intersection of the opposing track. This process may be repeated for each remaining pixel coordinate.

For J-curves, after thresholding the image, the produced image may be input into a separate algorithm for j-gaps. The separate algorithm may first remove excess noise in the produced image that was not removed during thresholding. After removing excess noise, holes in the produced image may be populated. Holes may occur after thresholding images. A blob search algorithm may be implemented to locate the tracks within the produced image, which provides us a bounding box of where each track is located. Then, the position and orientation of the tracks may be determined. The algorithm may locate and isolate the two bottom tracks of the produced image. The upper edges of these tracks are then located. If the two bottom tracks of the produced image are not determined, the algorithm may end. If a top track cannot be located, the algorithm may end. The pixel coordinates each track may then be determined. The distance between the top track and the edges of the bottom tracks may be calculated in relation to pixel distance. The pixel distance may be processed into a corresponding unit of measurement (for example, inches). This process may repeat until every pixel coordinate point on the bottom track is linked to a corresponding top track pixel coordinate point and all those measurements are determined.

The present disclosure may provide numerous advantages, such as the various technical advantages that have been described with respective to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Although this disclosure describes or illustrates particular embodiments as providing particular advantages, particular embodiments may provide none, some, or all of these advantages.

What is claimed is:

1. A workforce augmenting inspection device ("WAND"), comprising:
    a body, wherein the body comprises one or more buttons configured to actuate the WAND to perform one or more functions;
    a head disposed at a first end of the body, wherein the head comprises a camera and a light source, wherein the light source is disposed around the camera operable to produce light in conjunction with operation of the camera, wherein the camera is operable to capture an image within a scope of view of the camera;
    a standoff wheel coupled to the head, wherein the standoff wheel is operable to rotate independently of the head, wherein the diameter of the standoff wheel is greater than the dimensions of the head; and
    a power source disposed at a second end of the body operable to provide power to the WAND, wherein the power source comprises a controller, wherein the controller is communicatively coupled to and configured to actuate the head, camera, and light source.

2. The WAND of claim 1, wherein the one or more functions is selected from a group consisting of switching between a first mode of operation and a second mode of operation, actuating the head to rotate in a first direction, actuating the head to rotate in a second direction, and any combinations thereof.

3. The WAND of claim 1, wherein the body further comprises a display disposed along a surface of the body, wherein the display is operable to display data to an operator of the WAND.

4. The WAND of claim 3, wherein data displayed by the display is selected from a group consisting of a standoff distance from the head to an external structure, a parameter being measured by the WAND, a mode of operation of the WAND, an angle at which the head is rotated relative to the body, and any combinations thereof.

5. The WAND of claim 1, wherein the head further comprises:
 a servomotor operable to provide rotation of up to about 90° with reference to a central axis of the body; and
 a bracket coupled to the servomotor, wherein the servomotor is configured to rotate the bracket.

6. The WAND of claim 5, further comprising a first set of distance sensors and a second set of distance sensors disposed on the bracket, wherein the camera is disposed in between the first set of distance sensors and the second set of distance sensors.

7. A workforce augmenting inspection device ("WAND"), comprising:
 a body, wherein the body comprises one or more buttons configured to actuate the WAND to perform one or more functions;
 a head disposed at a first end of the body, wherein the head comprises a camera and a light source, wherein the light source is disposed around the camera operable to produce light in conjunction with operation of the camera, wherein the camera is operable to capture an image within a scope of view of the camera;
 a plurality of standoff legs disposed at the first end of the body, wherein each of the plurality of standoff legs extends past the head from the body; and
 a power source disposed at a second end of the body operable to provide power to the WAND, wherein the power source comprises a controller, wherein the controller is communicatively coupled to and configured to actuate the head, camera, and light source.

8. The WAND of claim 7, wherein the one or more functions is selected from a group consisting of switching between different colors produced by the light source, adjusting a brightness of the light produced by the light source, and any combinations thereof.

9. The WAND of claim 7, wherein there are three of the plurality of standoff legs, wherein each of the plurality of standoff legs is at disposed 120° away from each other.

10. The WAND of claim 7, wherein each of the plurality of standoff legs comprises a ball joint, wherein the ball joint is configured to allow for each of the plurality of standoff legs to rotate or swivel.

11. The WAND of claim 7, further comprising a contact pad disposed at a distal end of each of the plurality of standoff legs configured to contact an external surface.

12. The WAND of claim 11, wherein each of the contact pads are comprised of felt.

* * * * *